United States Patent Office 3,657,426
Patented Apr. 18, 1972

3,657,426
NOVEL METHOD OF CONTROLLING NEMATODES
Paul Herman Schroeder, Medina, N.Y., assignor to
FMC Corporation, New York, N.Y.
No Drawing. Continuation-in-part of application Ser. No.
605,993, Dec. 30, 1966. This application Nov. 26, 1969,
Ser. No. 880,381
Int. Cl. A01n 9/22
U.S. Cl. 424—200
12 Claims

ABSTRACT OF THE DISCLOSURE

Nematodes and other parasitic worm life in the soil are controlled by application of pyridonyl phosphorothionates of the general formula

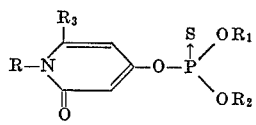

wherein R and $R_3$ are low molecular weight hydrocarbon radicals, and $R_1$ and $R_2$ are low molecular weight alkyl radicals. The preparation and physical properties of representative compounds of this class, and their application for the control of nematodes, are illustrated.

CROSS REFERENCE TO RELATED APPLICATIONS

This application is a continuation-in-part of copending application Ser. No. 605,993, filed Dec. 30, 1966, now abandoned, and is related to Ser. No. 880,382 filed Nov. 26, 1969, which is a continuation-in-part of Ser. No. 605,982, filed Dec. 30, 1966, now abandoned.

FIELD OF THE INVENTION

This invention pertains to the chemical control of agricultural pests, particularly to the control of nematodes by means of certain novel pyridonyl phosphorothionates.

While it has long been recognized that insects cause extensive crop damage, the more subtle damage caused by nematodes has been recognized only within recent years. Even though crop loss due to nematode damage has been estimated in the hundreds of millions of dollars in the United States alone, much of this damage is still unrecognized or unnoticed by the grower. While chemical control of insects is common, chemical control of nematodes is relatively new. The search for effective nematicides has been complicated by the highly specific nature of nematicidal activity, as well as by the absence of any useful correlation between insecticidal activity and nematicidal activity. Compounds highly effective against insects are frequently completely inactive against nematodes.

The first effective nematicides were volatile chemicals applied as soil fumigants. More recently certain non-volatile nematicides have been discovered. However, the novel properties and the high degree of nematicidal activity shown by the compounds disclosed herein have not previously been reported or suggested.

SUMMARY OF THE INVENTION

This invention pertains to a novel method of controlling nematodes and other parasitic worm life existing in the soil at some stage of its life cycle, e.g. as eggs, larvae, or adults. The method comprises the application of certain pyridonyl phosphorothionates to the pests to be controlled, or to the soil in which they live. Effective control is obtained without injury to plants growing in soil treated by the method of invention.

DETAILED DESCRIPTION

The active nematicidal compounds of this invention are pyridonyl phosphorothionates of the formula

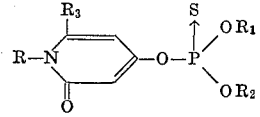

where R and $R_3$ are each a monovalent lower hydrocarbon radical, and $R_1$ and $R_2$ are each lower alkyl. Examples of $R_1$ and $R_2$ radicals are methyl, ethyl, n-propyl, isopropyl, tertiary butyl, isobutyl, sec-butyl, and n-butyl. In the R and $R_3$ radicals, it is preferred that no carbon atom be spaced from the valence bond (to which R or $R_3$ is attached) by more than four intervening carbon atoms; examples of R and $R_3$ radical are methyl, n-propyl, benzyl, phenyl, allyl, methallyl, butenyl-2, and butenyl-3. Preferred R groups are lower alkyl, lower alkenyl, or benzyl. Preferred $R_3$ groups are lower alkyl.

Particularly preferred are those compounds in which R is an alkyl of 1 to 4 carbon atoms inclusive or an alkenyl of 2 to 4 carbon atoms inclusive, and $R_1$, $R_2$, and $R_3$ are each methyl or ethyl.

The active nematicides of the invention may be prepared, for example, by reacting a phosphorus compound of the formula

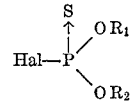

where "Hal" is halogen, preferably chlorine or bromine, with a 4-hydroxy-2-keto-1,2-dihydropyridine, of the formula:

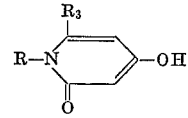

preferably in equimolecular proportions, with the elimination of hydrogen halide. The reaction is carried out in the presence of a hydrogen halide binding agent; for example, an alkali metal carbonate such as potassium carbonate. A solvent for the reactants should also be present and is preferably a polar solvent such as ethanol, dimethylformamide, acetonitrile, dimethyl sulfoxide, or an acetone/water mixture. The reaction is preferably conducted with heating, at a temperature of from 25 to 60° centigrade or at the reflux temperature of the reaction mixture. The reaction may be performed in the absence of a halogen halide binding agent if the dihydropyridine has an —OM substituent (where M is a metal, e.g. potassium) in place of its —OH substituent. The phosphorothionate reaction product may be recovered from the reaction mixture by adding the latter to an ice-water mixture, separating the organic layer and washing that layer with water to purify the water-insoluble, xylene-soluble reaction product.

The dihydropyridine compound used in the reaction may be produced, using well-known reaction techniques, from dehydroacetic acid (when $R_3$ is methyl in the formula below) or homologous compound, by the following reaction sequence:

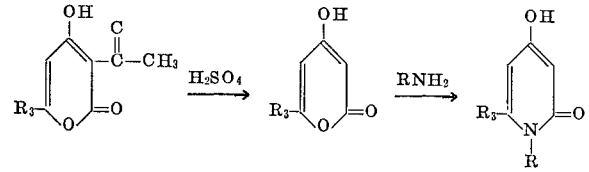

a dehydroacetic acid.

Determination of nematicidal activity

Control of nematodes was measured as follows:

Procedure A.—A nematode-infested soil was prepared by mixing larvae of the root-knot nematode (*Meloidogyne incognita*) into sandy loam soil so that the number of larvae in a given volume of soil was known. Into this infested soil was blended sufficient active ingredient, formulated as a 5 percent dust on attapulgite clay, to give a concentration of 25 p.p.m. These mixtures were held in the greenhouse under moist conditions for four days. Then young tomato plants were planted, each in a pot containing a volume of infested soil known to contain about 1,000 larvae, and allowed to grow for four weeks. At the end of this time, the roots of the tomato plants were freed of soil and the degree of infestation was evaluated in comparison with the check plants grown in nematode-infested soil which had received no chemical treatment. In each test the roots of the check plants were severely galled. When control of nematodes was complete, there were no galls on the roots. Intermediate degrees of control were estimated as a percentage of control, relative to the untreated check plants.

Evaluations of nematode control at lower rates were carried out in the same manner except smaller quantities of 5 percent dust were mixed into the soil and the young plants were allowed to grow for six weeks.

Procedure B.—When the six-week reading was completed, the roots of the test plants were cut up and mixed thoroughly with the soil in which they had been growing and new plants were planted in the mixture without re-infesting the soil. The control of the second generation of nematodes was measured by evaluating the knotting of roots of the new plant in the same manner as for the initial reading.

Similar tests were made starting with initial infestations predominately in the form of eggs.

Preparation of nematicidal compounds

The preparation of representative nematicidal phosphorothionates of this invention, and their nematicidal properties, are illustrated in the following examples, which are in no sense limitative of the scope of the invention. In the examples all temperatures are in degrees centigrade and all parts are by weight unless otherwise stated. The term "reduced pressure" not otherwise specified refers to the vacuum obtained with a water aspirator.

Example 1.—O,O-diethyl O-(1-allyl-1,2-dihydro-2-keto-6-methyl-4-pyridyl) phosphorothionate Sulfuric acid, S.G. 1.84 (379 ml.) was added to distilled water (53 ml.). The resulting solution was then heated and stirred in an oil bath at 74° C. Dehydroacetic acid (250 g.) was then dissolved in the sulphuric acid solution and heated to 120° C. during forty minutes The solution was then tested for completeness of reaction by adding a few drops of the reaction mixture to water. If the reaction had been completed, no immediate precipitate was observed. The solution was cooled to 20–25° C., and poured onto flaked ice (1 kg.) and stirred for one hour. The mixture was then filtered, washed with a little cold water, and dried to give the crude product (129 g.) in 68.7% yield. This material was suitable for the next stage. Thirty grams of the above, on recrystallization from water[1] (270 ml.) gave pure 4-hydroxy-6-methylpyran-2-one (18.6 g.) having a melting point of 186–188° C.

4-hydroxy-6-methylpyran-2-one (275 g.) was stirred in water (1400 ml.) and allylamine was added (180 ml.). The reaction mixture was heated to 75° C. during one hour and held at this temperature for a further four hours. Some separation of the product occurred after two-three hours' heating. The reaction mixture was allowed to cool and stand overnight, filtered, and the product washed with cold water and dried. Recrystalization from two parts of ethanol plus one part of benzene gave 1-allyl-1,2-dihydro - 4 - hydroxy - 6 - methylpyrid - 2 - one (222 g.), 61.5% yield having a melting point of 160–63° C.

1-allyl-1,2-dihydro-4-hydroxy - 6 - methylpyrid-2-one (1020 g.), anhydrous potassium carbonate (2 kg.), and ethyl methyl ketone (6000 ml.) were stirred at 40° C. for one hour. O,O-diethyl phosphorochloridothionate (1165 g.) was added dropwise during one hour. The reaction mixture was stirred for a further three hours and allowed to stand overnight. The supernatant solution was decanted and filtered and the residue washed with a further small quantity of ethyl methyl ketone which was added to the bulk. Evaporation of the solvent under reduced pressure yielded an oil which was dissolved in benzene (5000 ml.). The benzene solution was washed with 2 N sodium hydroxide solution (3× 750 ml.), water (500 ml.), saturated brine (500 ml.), and dried over anhydrous sodium sulphate. Evaporation of the solvent yielded O,O-diethyl O-(1-allyl-1,2-dihydro-2-keto-6-methyl-4-pyridyl)phosphorothionate as a purple oil (1620 g.); $n_D^{25}$ 1.5336.

With this compound outstanding nematode control was obtained in all the tests described previously, without damage to the plants. By Procedure A complete control was obtained at 5 p.p.m.

In an alternative procedure the substituted pyridone and the O,O-diethyl phosphorochloridothionate are added in small and equivalent portions, to a stirred mixture of anhydrous potassium carbonate in ethyl methyl ketone.

Example 2.—O,O-dimethyl O-(1,2-dihydro-2-keto-1,6-dimethyl-4-pyridyl) phosphorothionate 1,6-dimethyl-4-hydroxypyrid-2-one (13.9 g.), anhydrous potassium carbonate (27.6 g.) and acetone (250 ml.) were stirred at 40–50° C. for one hour. O,O-dimethyl phosphorochloridothionate (16 g.) was added dropwise over thirty minutes and the mixture stirred for a further two-three hours at 40° C. The mixture was then allowed to stand overnight.

Inorganic salts were then removed by filtration and the solvent removed in vacuo. The residual oil was dissolved in benzene (150 ml.) and washed with a 2 N solution of sodium hydroxide (3×100 ml.), water (100 ml.), and a saturated solution of sodium chloride and dried over anhydrous sodium sulfate. Removal of the solvent in vacuo yielded O,O-dimethyl O-(1,2-dihydro-2-keto-1,6-dimethyl-4-pyridyl) phosphorothionate as an oil, $n_D^{25}$ 1.5550. This compound gave complete control of nematodes at 5 p.p.m. by Procedure A.

Example 3.—O,O-dimethyl O-(1-allyl-1,2-dihydro-2-keto-6-methyl-4-pyridyl) phosphorothionate O,O-dimethyl O-(1-allyl-1,2-dihydro-2-keto-6-methyl-4-pyridyl) phosphorothionate was prepared in the manner described in Example 2 giving a solid, M.P. 54–7° (phosphorus content: theory, 10.73%; found on analysis, 10.9%). This compound gave complete control of nematodes at 5 p.p.m. by Procedure A.

Example 4.—O,O-di-n-propyl O-(1,2-dihydro-2-keto-1,6-dimethyl-4-pyridyl) phosphorothionate O,O-di-n-propyl O-(1,2-dihydro-2-keto-1,6-dimethyl-4-pyridyl) phosphorothionate was prepared in the same manner of Example 2 (phosphorus content: theory, 9.72%; found on analysis, 9.85%).

This compound gave approximately 75% control of nematodes at 10 p.p.m. by Procedure A.

Example 5.—O,O-diethyl O-(1,2-dihydro-2-keto-1,6-dimethyl-4-pyridyl) phosphorothionate O,O - diethyl O-(1,2-dihydro-2-keto-1,6-dimethyl-4-pyridyl) phosphorothionate was prepared in the manner de- ---
[1] The temperature of the water should not exceed 70° C., since decomposition occurs above this temperature.

scribed in Example 2 and had a melting point of 62–63° C.

This compound gave complete control of nematodes at 5 p.p.m. by Procedure A.

Example 6.—O,O-diethyl O-(1-benzyl-1,2-dihydro-2-keto-6-methyl-4-pyridyl) phosphorothionate O,O-diethyl O-(1-benzyl-1,2-dihydro-2-keto-6-methyl-4-pyridyl) phosphorothionate was prepared in the manner of Example 2 to yield a pale yellow oil (phosphorus content: theory, 8.44%; found on analysis, 8.4%).

This compound gave approximately 65% control of nematodes at 2 p.p.m. by Procedure A.

Example 7.—O,O-diethyl O-(1,2-dihydro-2-keto-6-methyl-1-(n-propyl)-4-pyridyl) phosphorothionate O,O - diethyl O-(1,2-dihydro-2-keto-6-methyl-1-(n-propyl)-4-pyridyl) phosphorothionate was prepared in the manner of Example 2 and had a melting point of 30–32° C.

This compound gave complete control of nematodes at 5 p.p.m. by Procedure A.

Example 8.—O,O-diethyl O-(1-allyl-6-ethyl-1,3-dihydro-2-oxo-4-pyridyl) phosphorothionate Step 1. Preparation of 6-ethyl-4-hydroxy-2H-pyran-2-one.—Concentrated sulfuric acid (37.9 ml.) was added to 5.3 ml. of water, and the mixture was stirred and heated at 74°, while 24.6 g. of 6-ethyl-4-hydroxy-3-propionyl-2H-pyran-2-one was added. The reaction mixture was then heated to 120° over a period of 40 minutes, cooled to about 25°, and poured onto 100 g. of crushed ice. The solid product was collected by filtration, washed with cold water and dried to give 11.4 g. of 6-ethyl-4-hydroxy-2H-pyran-2-one, M.P. 104–106°, structure confirmed by infrared and nuclear magnetic resonance spectroscopy.

Step 2. Preparation of 1-allyl-6-ethyl-1,2-dihydro-4-hydroxy-2-oxopyridine.—To a mixture of 11.4 g. of 6-ethyl-4-hydroxy-2H-pyran-2-one and 80 ml. water was added 5.0 g. of allylamine. The reaction mixture was slowly heated to 75° over a period of one hour and stirred at 70–75° for five hours. During the reaction a light-colored solid came out of solution. After cooling, the reaction mixture was chilled in an ice-bath, and the product was collected by filtration, washed with cold water, and dried to give 10.8 g. of 1-allyl-6-ethyl-1,2-dihydro-4-hydroxy-2-oxopyridine, M.P. 185–187°. The identity of the product was confirmed by infrared and nuclear magnetic resonance spectroscopy.

Analysis.—Calc'd. for $C_{10}H_{13}NO_2$ (percent): C, 67.02; H, 7.31; N, 7.82. Found (percent): C, 67.13; H, 7.39; N, 7.70.

Step 3.—Preparation of O,O-diethyl O-(1-allyl-6-ethyl-1,2 - dihydro-2-oxo-4-pyridyl) phosphorothionate.—To a suspension of 10 g. of 1-allyl-6-ethyl-1,2-dihydro-4-hydroxy-2-oxopyridine in 100 ml. of 2-butanone was added 8 g. of potassium carbonate. The mixture was stirred and heated at 50–60° for one hour, at 70° for an additional hour, and then 10.9 g. of O,O-diethyl phosphorochloridothionate was slowly added. The reaction mixture was stirred at 65° for about 16 hours, then chilled and filtered. The filtered solid was washed with a little 2-butanone, and the combined filtrate and wash were concentrated under reduced pressure to give 19.2 g. of non-volatile oil. For separation of the product by chromatography a column (height:diameter=10:1) was prepared with 150 g. WOELM acidic alumina (activity III) (lower layer) and 150 g. WOELM basic alumina (activity III) (upper layer). The residual oil was extracted with three 100-ml. volumes of hexane, and the hexane extracts were applied to the column. The remaining oil was then dissolved in 45 ml. of benzene/hexane (2:1), and this solution was also applied to the column. The column was eluted with benzene/hexane (2:1), and the progress of the yellow band of product down the column was followed visually. The eluant just before and following the yellow band was collected in portions of about 125 ml. Five such fractions, after examination by thin layer chromatography on silica gel, were combined and stripped of solvent under reduced pressure (aspirator and vacuum pump). Nuclear magnetic resonance spectroscopy showed that the concentrated product (9.7 g. of oil) contained some of the starting phosphorochloridothionate. This crude product was extracted with three 20-ml. volumes of warm hexane, and the hexane extracts were applied to a column of basic alumina (activity III) containing 100 g. of alumina. The extracted oil was dissolved in 200 ml. of benzene/hexane (1:3) and this solution was applied to the column. The product, a yellow band on the column, was eluted with benzene/hexane (1:3) and concentrated under reduced pressure as before to give 8.4 g. of oil, O,O-diethyl O-(1-allyl-6-ethyl-1,2-dihydro - 2 - oxo - 4 - pyridyl) phosphorothionate, structure confirmed by nuclear magnetic resonance spectroscopy.

Analysis.—Calc'd for $C_{14}H_{22}NO_4PS$ (percent): C, 50.74; H, 6.69; N, 4.23; P, 9.35. Found (percent): C, 50.46; H, 6.83; N, 4.14; P, 9.14.

This compound gave approximately 90% control of nematodes at 5 p.p.m. by a test method similar to Procedure A except that the tomato plants were examined after growing for two to three weeks in the nematode-infested soil. In this modification of Procedure A the untreated check plants had severely galled roots.

Example 9.—O,O-diethyl O-(1,6-diethyl-1,2-dihydro-2-oxo-4-pyridyl) phosphorothionate Step 1.—Preparation of 1,6-diethyl-1,2-dihydro-4-hydroxy-2-oxopyridine.—By a procedure similar to that of Example 8, Step 2, 7.8 g. of ethylamine was reacted with 16.3 g. of 6-ethyl-4-hydroxy-2H-pyran-2-one. First the amine and then the pyranone were slowly added to 100 ml. of chilled water. After the mixture was stirred at 0–4° for one hour, the temperature was raised to 75° over a period of 1½ hours. The reaction mixture was stirred at 75° for five hours during which time the product precipitated. The product was collected by filtration, washed, and dried to yield 4.0 g. of light tan solid, M.P. 237–241°. An additional 5.9 g., M.P. 220–233°, was obtained by acidification of the chilled filtrate with glacial acetic acid. Recrystallization from ethanol gave a white solid, 1,6-diethyl-1,2 - dihydro - 4 - hydroxy - 2 - oxopyridine, M.P. 241–243°, structure confirmed by infrared spectroscopy.

Step 2.—Preparation of O,O-diethyl O-(1,6-diethyl-1,2-dihydro-2-oxo - 4 - pyridyl) phosphorothionate.—By the procedure of Example 1, Step, 3, 11.5 g. of O,O-diethyl phosphorochloridothionate was reacted with 9.3 g. of 1,6-diethyl - 1,2 - dihydro - 4 - hydroxy - 2 - oxopyridine in the presence of 8.4 g. of potassium carbonate and 100 ml. of 2-butanone at 60° for five hours. Solvent was removed from the filtered reaction mixture to give 17.8 g. of non-volatile oil.

The oil was extracted with one 100-ml. volume and two 50-ml. volumes of ether. The ether extracts were washed with two 100-ml. volumes of five percent sodium carbonate and then with two 100-ml. volumes of water, dried over sodium sulfate, and concentrated under reduced pressure to give 12.0 g. of red residual oil. This oil was heated at 40°, 0.05 mm. Hg pressure, for 48 hours to remove unreacted O,O-diethyl phosphorochloridothionate. The remaining red oil was stirred with 150 ml. of hexane at 40° for 12 hours and the hexane extract decanted. This process was repeated four times with shorter heating periods (1 hour, 3 hours, 1 hour and 2 hours, respectively). These hexane extracts were applied to a column of WOELM acidic alumina (activity III) (120 g., height: diameter 10:1). The column was eluted sequentially with 750 ml. of hexane (collected as five 150-ml. fractions), 500 ml. of benzene/hexane (1:1), 500 ml. of benzene and 250 ml. of benzene/ether (1:1). Fractions were collected and checked for product purity by thin layer chromatography on silica gel. The last 450 ml. of hexane eluate and the benzene containing fractions were retained. Solvent was removed from these fractions under reduced pressure (aspirator and vacuum pump), and the residual oils were combined to give 7.4 g. of O,O-diethyl O-(1,6-diethyl - 1,2 - dihydro - 2 - oxo - 4 - pyridyl) phosphorothionate, structure confirmed by infrared and nuclear magnetic resonance spectroscopy.

*Analysis.*—Calc'd for $C_{13}H_{22}NO_4PS$ (percent): C, 48.89; H, 6.94; N, 4.39; P, 9.70. Found (percent): C, 48.70; H, 6.84; N, 4.31; P, 9.89.

This compound gave complete control of nematodes at 5 p.p.m. by a test method similar to Procedure A except that the tomato plants were examined after growing for two to three weeks in the nematode-infested soil. In this modification of Procedure A the untreated check plants had severely galled roots.

The active chemical compounds of the invention, like most agricultural chemicals, are not usually applied full strength. They are generally incorporated with the adjuvants and carriers normally employed for facilitating dispersion of active ingredients for agricultural chemical applications, recognizing the accepted fact that the formulation and mode of application may affect the activity of the material. The toxicants of this invention may be applied as a spray, dust, or granule. They may be formulated as granules of large particle size, as powdery dusts, as wettable powders, as emulsifiable concentrates, or as solutions. More preferably, they are applied dispersed on granular carriers, or as wettable powder.

In granular formulations, for example, the toxicant is spread on the surface of, or absorbed in, a granular carrier which may be inert or may be a fertilizer or other active material.

Wettable powders are in the form of finely divided particles which disperse readily in water or other dispersant, normally due to the presence of a dispersing agent. The powder may be applied to the soil either as a dry dust or preferably as an emulsion in water. Typical carriers include Fuller's earth, kaolins, silicas, and other highly absorbent organic diluents. Typical wetting, dispersing, or emulsifying agents used in agricultural formulations include, for example, the alkyl and alkylarylsulfonates and sulfates and their sodium salts, alkylamide sulfonates, including fatty methyl taurides; alkylaryl polyether alcohols, sulfated higher alcohols, and polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface-active agents are available in commerce. The surface-active agent when used, normally comprises from one percent to fifteen percent by weight of the nematicidal composition.

The active ingredient, when mixed with a finely ground solid such as talc, may be applied as a dust; or it may be combined with a solvent and a wetting agent in the form of an emulsifiable concentrate which is then diluted further with water for application to the soil. All of these techniques for formulating and applying active ingredients to the soil are well known in the art.

Typical formulations are:

WETTABLE POWDERS

| | Percent w./w. |
|---|---|
| Active ingredient | 25.00 |
| Sodium lignosulfonate | 1.50 |
| Sodium alkylnaphthalenesulfonate | 1.50 |
| Attapulgite clay | 72.00 |

EMULSIFIABLE CONCENTRATES

| | Percent w./w. |
|---|---|
| Active ingredient | 20.00 |
| Calcium alkylbenzenesulfonate | 3.00 |
| Polyalkylene glycol ethers | 2.00 |
| Xylene | 75.00 |

DUSTS

| | Percent w./w. |
|---|---|
| Active ingredient | 5.00 |
| Sodium lignosulfonate | 1.90 |
| Sodium alkylbenzenesulfonate | 1.90 |
| Attapulgite clay (325 mesh) | 91.20 |

GRANULES

| | Percent w./w. |
|---|---|
| Active ingredient | 15.15 |
| Isophorone | 15.15 |
| Attapulgite clay (24/48 mesh) | 69.70 |

In each of the above formulations the preferred active ingredient is O,O-diethyl O-(1-allyl-1,2-dihydro-2-keto-6-methyl-4-pyridyl) phosphorothionate. This compound may be replaced by, or combined with, other active compounds of this invention.

The rate of application of the active ingredient to the soil may be, for example, in the range of about 0.2 to 500 pounds per acre, and the concentration of the active ingredient in the soil may be, for instance, in the range of about 0.1 to 100 p.p.m. The active ingredients described herein have been found to have high nematicidal activity even at low concentrations.

Other compounds of the invention may be prepared in a manner similar to those exemplified above, for example O,O-diethyl O-(1-ethyl - 1,2 - dihydro-2-keto-6-methyl-4-pyridyl) phosphorothionate and O,O-dimethyl O-(1-ethyl-1,2-dihydro-2-keto-6-methyl - 4 - pyridyl) phosphorothionate.

I claim:

1. The method of controlling nematodes in the soil which comprises applying thereto a nematicidal amount of a compound of the formula

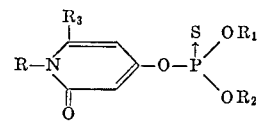

where R and $R_3$ are each lower alkyl, lower alkenyl, or benzyl, and $R_1$ and $R_2$ are each lower alkyl.

2. The method of claim 1 in which $R_3$ is lower alkyl.
3. The method of claim 1 in which R is alkyl of 1 to 4 carbon atoms inclusive or alkenyl of 2 to 4 carbon atoms inclusive, and $R_1$, $R_2$ and $R_3$ are each methyl or ethyl.
4. The method of claim 1 wherein said compound is O,O-diethyl O-(1-allyl - 1,2 - dihydro-2-keto-6-methyl-4-pyridyl) phosphorothionate.
5. The method of claim 1 wherein said compound is O,O-diethyl O-(1,2-dihydro - 2 - keto-6-methyl-1-(n-propyl)-4-pyridyl) phosphorothionate.
6. The method of claim 1 wherein said compound is O,O-diethyl O-(1,2-dihydro - 2 - keto-6-methyl-1-(n-propyl)-4-pyridyl) phosphorothionate.
7. The method of claim 1 wherein said compound is O,O-diethyl O-(1-ethyl - 1,2 - dihydro-2-keto-6-methyl-4-pyridyl) phosphorothionate.
8. The method of claim 3 in which $R_1$ and $R_2$ are each ethyl.

9. The method of claim 3 in which R is allyl.

10. The method of claim 3 in which R and $R_3$ are each methyl.

11. The method of claim 4 which comprises applying to nematode-infested soil a nematicidal amount of an aqueous dispersion of said compound.

12. The method of claim 4 which comprises applying to nematode-infested soil a nematicidal amount of said compound on an inert granular carrier.

References Cited

UNITED STATES PATENTS 3,244,586 4/1966 Rigterink _____ 424—200
3,326,752 6/1967 Rigterink _____ 424—200

STANLEY J. FRIEDMAN, Primary Examiner

U.S. Cl. X.R.

260—294.8

UNITED STATES PATENT OFFICE
CERTIFICATE OF CORRECTION

Patent No. 3,657,426     Dated April 18, 1972

Inventor(s)     Paul Herman Schroeder

It is certified that error appears in the above-identified patent and that said Letters Patent are hereby corrected as shown below:

Column 2, lines 65 to 70, that portion of the formula reading

Column 7, line 13, the analysis for phosphorus reading "P, 9.89" should read -- P, 9.87 --.

Signed and sealed this 1st day of April 1975.

(SEAL)
Attest:

RUTH C. MASON
Attesting Officer

C. MARSHALL DANN
Commissioner of Patents
and Trademarks